United States Patent
Nomura et al.

(10) Patent No.: US 11,229,846 B2
(45) Date of Patent: Jan. 25, 2022

(54) PROVIDING A SHARED VIRTUAL EXPERIENCE IN A LOCATION-BASED GAME

(71) Applicant: Niantic, Inc., San Francisco, CA (US)

(72) Inventors: Tatsuo Nomura, San Francisco, CA (US); Dennis Hwang, San Francisco, CA (US); Edward Wu, Kirkland, WA (US); Kevin Doo, Seattle, WA (US); Naoyuki Ishitsuka, Tokyo (JP); Calin Matney, Bellevue, WA (US); David Hollin, San Francisco, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 16/918,332

(22) Filed: Jul. 1, 2020

(65) Prior Publication Data

US 2020/0330874 A1 Oct. 22, 2020

Related U.S. Application Data

(63) Continuation of application No. 16/012,714, filed on Jun. 19, 2018, now Pat. No. 10,737,178.

(Continued)

(51) Int. Cl.
| | |
|---|---|
| *A63F 13/216* | (2014.01) |
| *A63F 13/847* | (2014.01) |
| *A63F 13/65* | (2014.01) |
| *A63F 13/79* | (2014.01) |
| *A63F 13/48* | (2014.01) |
| *A63F 13/35* | (2014.01) |
| *A63F 13/822* | (2014.01) |

(52) U.S. Cl.
CPC ............ *A63F 13/65* (2014.09); *A63F 13/216* (2014.09); *A63F 13/35* (2014.09); *A63F 13/48* (2014.09); *A63F 13/79* (2014.09); *A63F 13/847* (2014.09); *A63F 13/822* (2014.09)

(58) Field of Classification Search
None
See application file for complete search history.

(56) References Cited

U.S. PATENT DOCUMENTS

| | | |
|---|---|---|
| 8,353,767 B1 | 1/2013 | Borst et al. |
| 9,539,498 B1 | 1/2017 | Hanke et al. |

(Continued)

OTHER PUBLICATIONS

PCT International Search Report and Written Opinion, PCT Application No. PCT/US18/38368, dated Sep. 6, 2018, 17 pages.

(Continued)

*Primary Examiner* — Damon J Pierce
(74) *Attorney, Agent, or Firm* — Fenwick & West LLP

(57) ABSTRACT

A shared virtual experience is provided to players of a location-based game. The virtual location of a player in the game is based on the real world location of the player's client device. If a player's location in the game is within an interaction distance of a virtual element, in indication that a shared virtual experience is available may be provided. Player input is received requesting participation in the shared virtual experience and the player is added to a lobby including a specified start time. At the specified time, the shared virtual experience begins and includes interaction with other players who were in the lobby. An update to game data is sent based on an outcome of the shared virtual experience.

22 Claims, 7 Drawing Sheets

Related U.S. Application Data

(60) Provisional application No. 62/522,023, filed on Jun. 19, 2017.

(56) References Cited

U.S. PATENT DOCUMENTS

| | | |
|---|---|---|
| 9,604,131 B1 | 3/2017 | Kiyohara et al. |
| 10,198,901 B1 | 2/2019 | Wakeford |
| 2006/0223599 A1 | 10/2006 | Alfaro et al. |
| 2006/0287106 A1 | 12/2006 | Jensen |
| 2007/0191116 A1 | 8/2007 | Gardiner |
| 2008/0146338 A1* | 6/2008 | Bernard .................. A63F 13/10 463/42 |
| 2012/0015748 A1 | 1/2012 | Osada |
| 2012/0094770 A1 | 4/2012 | Hall |
| 2014/0179418 A1 | 6/2014 | Vignocchi et al. |
| 2015/0375113 A1 | 12/2015 | Justice et al. |
| 2016/0016083 A1 | 1/2016 | Davis et al. |
| 2016/0166928 A1 | 6/2016 | Hussman et al. |

OTHER PUBLICATIONS

United States Office Action, U.S. Appl. No. 16/012,714, dated Nov. 19, 2019, 14 pages.
United States Office Action, U.S. Appl. No. 16/012,714, dated Jul. 23, 2019, 14 pages.

* cited by examiner

PROVIDING A SHARED VIRTUAL EXPERIENCE IN A LOCATION-BASED GAME

RELATED APPLICATIONS

This application is a continuation of U.S. patent application Ser. No. 16/012,714 filed on Jun. 19, 2018, which claims the benefit of priority of U.S. Provisional Patent Application No. 62/522,023 filed on Jun. 19, 2017; both of which are incorporated herein by reference.

TECHNICAL FIELD

The present disclosure relates generally to location-based gaming, and more particularly, to multiplayer interactions in a location-based game.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. Such gaming systems typically do not have a virtual world geography that parallels the real world. Location-based games use the real world as their geography. Some location-based games add virtual locations on a map that parallels the real world geography. Such games, however, are typically focused on real world objectives. These games typically do not include a virtual world that parallels the real world and that acts as a virtual game environment in which many players can interact and perform various game objectives in the parallel virtual world by navigating and performing actions in the real world.

A parallel reality game providing a shared virtual world that parallels at least a portion of the real world allows players to interact with elements of the virtual world by navigating the real world. However, when actions are primarily undertaken with reference to the virtual world, the virtual world can act as a barrier to players engaging with each other. Players interact with the virtual world, making other players seem remote or unreal. As a result, even when many individuals are playing in a geographic region of the real world, the gaming experience may feel individual rather than social.

SUMMARY

Shared virtual experiences are provided to players in a location-based, parallel reality game, The shared virtual experiences involve multiple players participating in the same event to achieve mutual goals and/or compete with each other (e.g., in teams) to achieve objectives. To participate in the shared virtual experience in the virtual world, players may need to congregate at a specified location in the real world (e.g., one corresponding to a virtual element in the virtual world). This may encourage players to collaborate and otherwise interact in the real world to achieve mutual objectives while playing the game, thus improving the functionality available in the virtual world.

In one embodiment, a method for providing a shared virtual experience in a location-based game includes receiving selection of a virtual element located at a virtual location in a virtual world that corresponds to a real world physical location, determining a virtual location of a player in the virtual world based on a real world location of a client device associated with the player, and providing an indication that the shared virtual experience is available in response to the virtual location of the player being within an interaction range of the virtual location of the virtual element. The method also includes receiving player input requesting participation in the shared virtual experience and assigning the player to a lobby for the shared virtual experience in response to the player input. The lobby may have a specified start time for the shared virtual experience. The method further includes providing the shared virtual experience at the specified start time and sending a game data update to a game server based on an outcome of the shared virtual experience. The shared virtual experience includes interacting with other players who were in the lobby.

Other exemplary implementations of the present disclosure are directed to systems, apparatus, non-transitory computer-readable media, devices, and user interfaces for providing shared interactive experiences in a virtual world for a group of players in geographic proximity in the real world.

These and other features, aspects and advantages may be better understood with reference to the following description and appended claims. The accompanying drawings illustrate specific embodiments and, together with the description, serve to explain various principles. However, the drawings should not be considered limiting. Rather, the scope of protection should be determined from the claims.

DETAILED DESCRIPTION

Figure 1:
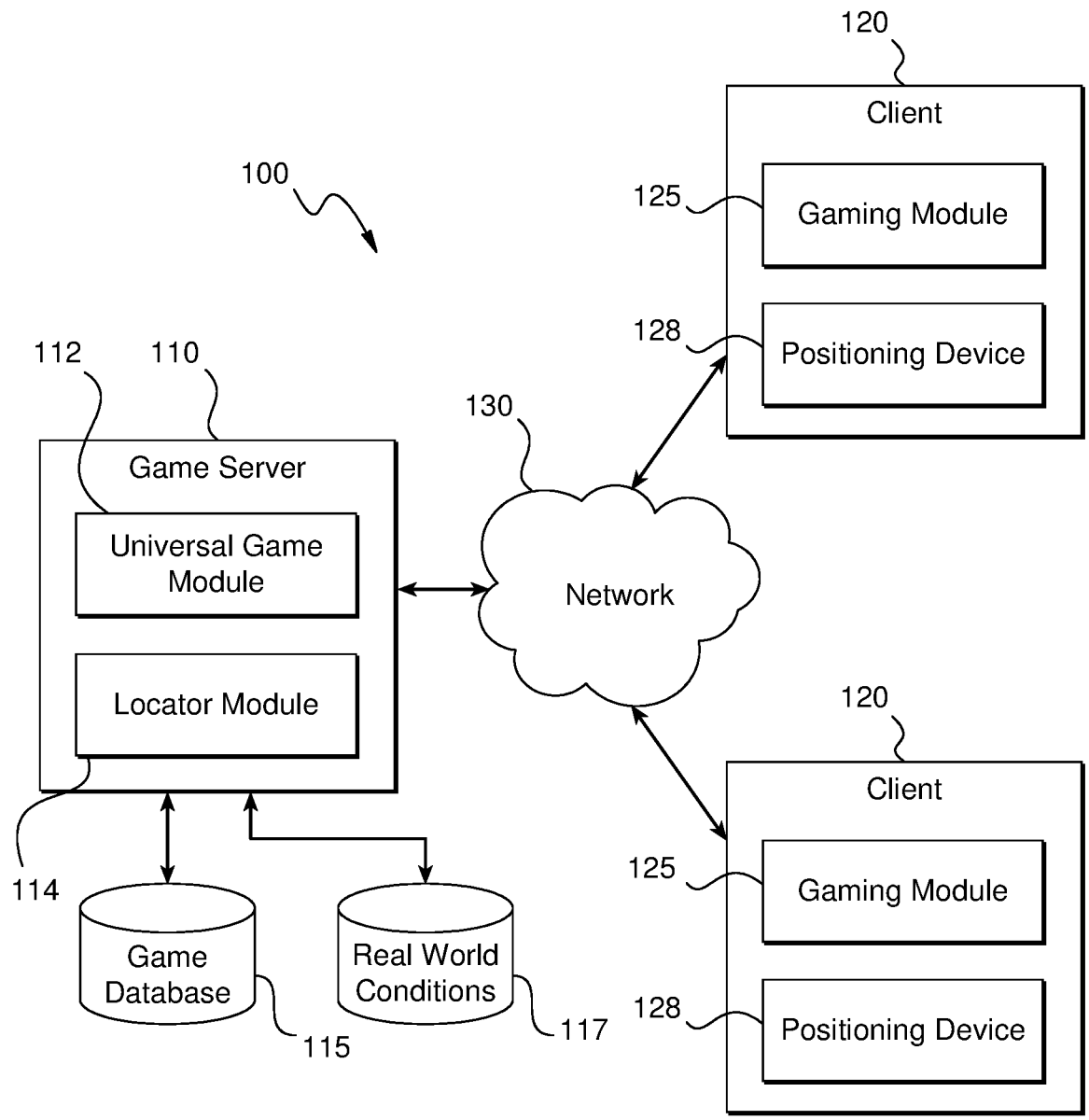
FIG. 1 depicts a computer-based system for implementing a location-based game, according to one embodiment.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure relates to parallel reality games that occur in virtual worlds that are mapped to real world locations. The virtual world has experiences that relate to real world actions, such experiences incorporating virtual elements, such as virtual objects, virtual items, virtual energy, and other virtual elements, that can be used or collected by players of a parallel reality game having a virtual world that parallels at least a portion of the real world. In particular, the experiences in the virtual world are determined based on data associated with one or more real world actions. In this way, virtual experiences can correspond to actions in the real world that make game play more immersive. Moreover, locating virtual experiences in the virtual world based on data associated with real world actions improves the link between the parallel virtual world and the real world, further enhancing the illusion that the virtual world is another dimension of the real world that the player can perceive and interact with through the parallel reality game. In particular, shared virtual experiences may be provided to a group of users who are physically at the same (or a similar) location in the real world.

A game server can host a location-based parallel reality game having a player gaming area that includes a virtual environment with a geography that parallels at least a portion of the real world geography. Players can navigate a virtual space in the virtual world by navigating a corresponding geographic space in the real world. In particular, players can navigate a range of coordinates defining a virtual space in the virtual world by navigating a range of geographic coordinates in the real world.

In one aspect, the positions of players can be monitored or tracked using, for instance, a positioning system (e.g. a GPS system) associated with a player's mobile computing device (e.g. cell phone, smartphone, gaming device, or other device). As players move about in the real world, player position information can be provided to the game server hosting the parallel reality game over a network. The game server can update player positions in the parallel virtual world to correspond with the player positions in the real world.

The parallel reality game can include one or more virtual elements that players can interact with during the course of the parallel reality game. To interact with virtual elements, a player may have to travel to the corresponding location of the virtual element in the real world and perform any necessary interactions in the parallel reality game. According to aspects of the present disclosure, virtual experiences can be generated in the virtual world based on data associated with real world actions. The data associated with real world actions can be analyzed to determine experiences in the virtual worlds. For instance, actions in the real world can result in experiences in the virtual world that result from the real world actions.

Tying virtual experiences to real world actions permits a more engaging experience for players. In this manner, the subject matter of the present disclosure can have a technical effect of providing for an improved computer-based implementation of a parallel reality game that provides for the generation of virtual experiences in a parallel reality game in a manner that improves the link between the real world and the parallel virtual world.

In one embodiment, a game server associated with a parallel reality game can access data associated with the location of individuals in the real world. The data associated with the location of individuals in the real world can be obtained or derived from any suitable source. The data associated with the location of individuals in the real world can include the locations of mobile device users in the real world. In particular, users of mobile devices, such as smart phones, can optionally provide position information, in terms of geographic location in the real world, in order to enhance certain location-based features or other functionality. Any information optionally provided by mobile device users can be provided on conditions of anonymity to protect the privacy of the user optionally providing the position information.

Data associated with the locations of individuals in the real world can also include data associated with the locations of players of the parallel reality game. In particular, the game server can receive position information from each of the plurality of players during play of the parallel reality game such that the game server can update the position of the player in the parallel virtual world associated with the parallel reality game.

The game server can analyze the data associated with the locations of individuals in the real world and generate a virtual experience based on such data. For instance, the game server can locate virtual elements in the virtual world for a user that are collected when that user (or another different user) travels to a particular location in the real world. In certain aspects, the virtual elements can be used to enhance an experience in the real world. For example, virtual elements can be exchanged or presented for one or more goods or services in the real world. Generation of virtual experiences in a virtual world based on real world actions can give players a reason to travel to a particular location in the real world.

In a particular implementation, certain real world actions can be directly and/or indirectly mapped to experiences in the virtual world. For instance, weather data from the real world can have a direct mapping to virtual weather in the virtual world. Similarly, weather data in the real world can be indirectly mapped to the virtual world, such as by causing certain virtual elements to be more challenging to locate when weather conditions in the real world indicate rain. As described herein, such mapping can include any real world action and can directly and/or indirectly map to one or more experiences in the virtual world, regardless of whether such experience is related to the real world action. As another example, a solar eclipse in the real world could indirectly map to the virtual world and result in a virtual experience in which virtual energy is increased for all players in the virtual world. Alternatively, or in combination with the aforementioned example, the solar eclipse could directly map to the virtual world and cause a virtual solar eclipse that is visible in the virtual world. In this way, the game server can generate virtual experiences in the virtual world from real world actions.

The game server can generate virtual experiences in the parallel virtual world based on other data associated with real world actions. For instance, the game server can create virtual experiences based on real world actions associated with items of cultural, recreational, or commercial value, map data, hazard data, weather data, event calendar data, and other suitable data. As an example, the game server can include virtual experiences in the virtual world based on actions associated with real world items corresponding to locations of public, educational, commercial, or recreational value, such as locations of public artwork, tourist attractions, scenic vistas, libraries, or hiking trails.

Other exemplary applications of data associated with real world actions can include two or more users working together in the real world to achieve one or more goals in the virtual world as a virtual experience. As an example, the virtual experiences in the virtual world can include shared virtual experiences in which two or more users assemble at a particular location in the real world. The two or more users may then collaborate to achieve a mutual objective in the virtual world.

Still other exemplary applications of data associated with real world actions can include a first user and second user that travel to a real world location to exchange virtual elements in a virtual world between one another. The virtual elements could be messages, items, or the like. For instance, a first user can travel to a real world location and leave a virtual element in the virtual world for the second user. The second user can then travel to the location in the real world to collect the virtual element in the virtual world.

According to particular aspects of the present disclosure, two or more actions as described herein can be combined to result in one or more virtual experiences. For instance, two or more virtual elements can be distributed throughout the virtual world and require two or more users to engage in real world actions of visiting one or more real world locations to collect such virtual elements. Once users have collected all of the virtual elements, the game server can provide a virtual experience when the users assemble together at a real world location. In alterative implementations, a user can provide their respective virtual element to a different user that then assembles together with the other users at a real world location.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods for modifying or verifying game data according to aspects of the present disclosure can be implemented using a single computing device or across multiple computing devices.

FIG. 1 illustrates an exemplary computer-implemented location-based gaming system 100 configured in accordance with an embodiment. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
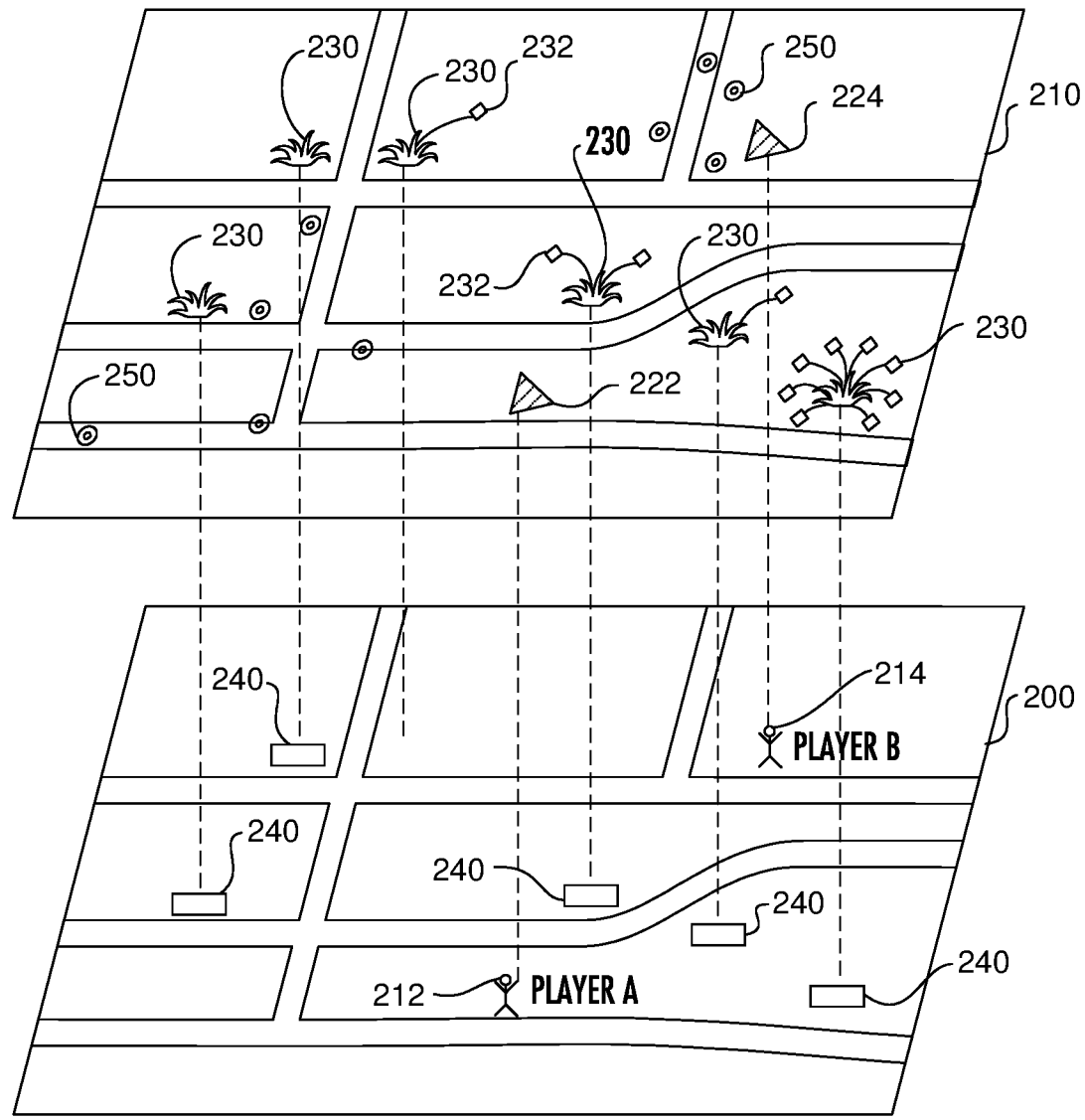
FIG. 2 depicts a representation of a virtual world having a geography that parallels the real world, according to one embodiment.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a countly, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, player A, located at position 212 in the real world 200, has a corresponding position 222 in the virtual world 210. Similarly, player B, located at position 214 in the real world 200, has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective can include players capturing or otherwise claiming ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player may travel to the landmark or geographic location 240 linked to the virtual elements 230 in the real world and interact with the virtual elements 230 in the virtual world 210. For example, player A of FIG. 2 may travel to a landmark 240 in the real world 200 in order to interact with or capture a virtual element 230 linked with that particular landmark 240. The interaction with the virtual element 230 can be tied to action in the real world, such as taking a photograph and/or verifying, obtaining, or capturing other information about the landmark or object 240 associated with the virtual element 230.

Game objectives can include that players use one or more virtual items that are collected by the players in the location-based game. For instance, the players may travel the virtual world seeking virtual items (e.g. weapons, food, medical supplies, soldiers, creatures, or other items) that can be useful for completing game objectives. These virtual items can be found or collected by traveling to different locations in the real world or by completing various actions in either the virtual world or the real world. For example, players may interacts with virtual elements 230 in the virtual world to obtain virtual items. In the embodiment shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the player's team and/or faction.

In one particular implementation, a player may gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be temporarily disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. For convenience, all such groupings of players are referred to as teams herein. In this manner, the location-based game can intrinsically be a social game that encourages cooperation among players within the game. Players from opposing teams can work against each other during the location-based game. A player can use virtual items to attack or impede progress of players on opposing teams. In some instances, players from different teams may collaborate in certain shared virtual experiences (e.g., boss battles) to achieve a common objective.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal gaming module 112 that controls aspects of the location-based game for players and receives and processes input from players in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions (e.g. portions of the virtual world specific to player locations) of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include a processor and a memory. The memory can store instructions which cause the processor to perform operations.

The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, player inventory, current player positions in the virtual world/real world, player energy level, player preferences, team information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements, corresponding actual world position information for virtual elements, behavior of virtual elements, relevance of virtual elements, etc.); (5) data associated with real world objects, landmarks, positions linked to virtual world elements (e.g. location of real world objects/landmarks, description of real world objects/landmarks, relevance of virtual elements linked to real world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

As will be discussed in further detail below, the game server 110 can include or can also be in communication with a real world action database 117. The real world action database 117 can be a part of, integral with, or separate from the game database 115. The real world action database 117 stores data associated with real world actions, such as such as the individual and/or aggregate locations of players in the real world; actions associated with locations of cultural value or commercial value; map data providing the locations of roads, highways, and waterways; current and past locations of individual players; hazard data, weather data; event calendar data; and other suitable data. The data stored in the real world action database 117 can be collected or obtained from any suitable source. For example, in one aspect, the real world action database 117 can be coupled to, includes, or is part of a map database storing map information, such as one or more map databases accessed by a mapping service. According to another exemplary aspect, the real world action database 117 can obtain or access data associated with past and current locations of players, for instance, from the game database 115. According to yet another exemplary aspect, the real world action database 117 can be coupled to one or more external data sources or services that periodically provide population data, hazard data, weather data, event calendar data, or other data to the real world action database 117.

The game server 110 can be configured to receive requests for game data from one or more clients 120 (for instance, via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input, player location, and other updates to the game server 110, which the game server 110 uses to update game data in the game database 115 to reflect changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data to the clients 120 over the network 130.

In the embodiment shown in FIG. 1, the game server 110 also includes a locator module 114. The locator module 114 can be a part of or separate from the universal game module 112. The locator module 114 is configured to access data associated with real world actions, analyze the data, and determine virtual experiences in the virtual world based on the data associated with real world actions. For instance, the locator module 114 can modify game data stored in the game database 115 to locate virtual experiences in the virtual world based on the data associated with real world actions.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any computing device that can be used by a player to interact with the gaming system 100. For instance, a client 120 can be a wireless device, a personal digital assistant (PDA), portable gaming device, cellular phone, smartphone, tablet, navigation system, handheld GPS system, or other such device. In short, a client 120 can be any computer-device or system that can execute a gaming module 125 to allow a player to interact with the virtual world.

The gaming module 125 executed by the client 120 provides an interface between a player and the location-based game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130. Various embodiments of the gaming module 125 are described in greater detail below, with reference to FIG. 5.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world based on the actual position of the player in the real world. In particular, the location of the player in the virtual world can correspond to the location of the player in the real world. The gaming module 125 can provide player position information to the game server 110 over the network 130 such that the universal gaming module 112 keeps track of player positions throughout the game.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, S1v1TP, FTP), encodings or formats (e.g. HTML, JSON, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
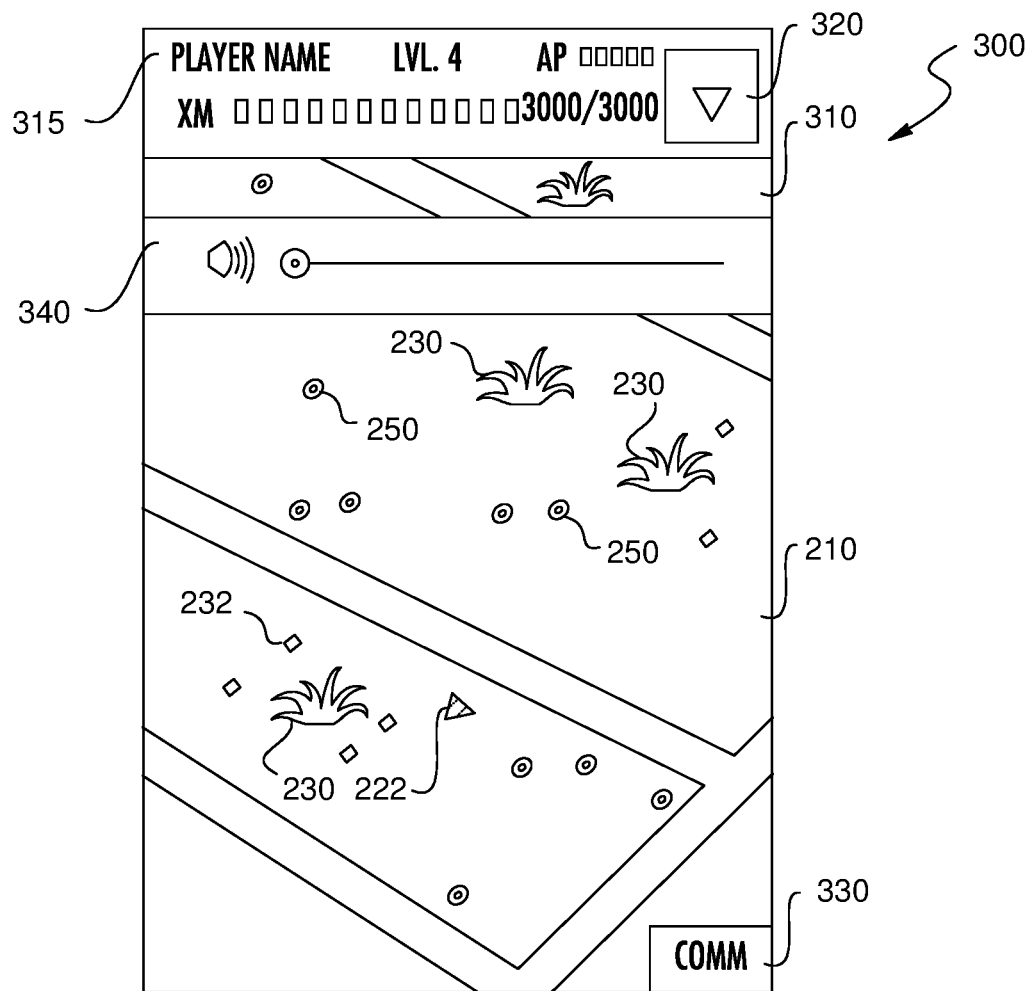
FIG. 3 depicts an exemplary game interface of a location-based game, according to one embodiment.

FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Figure 4:
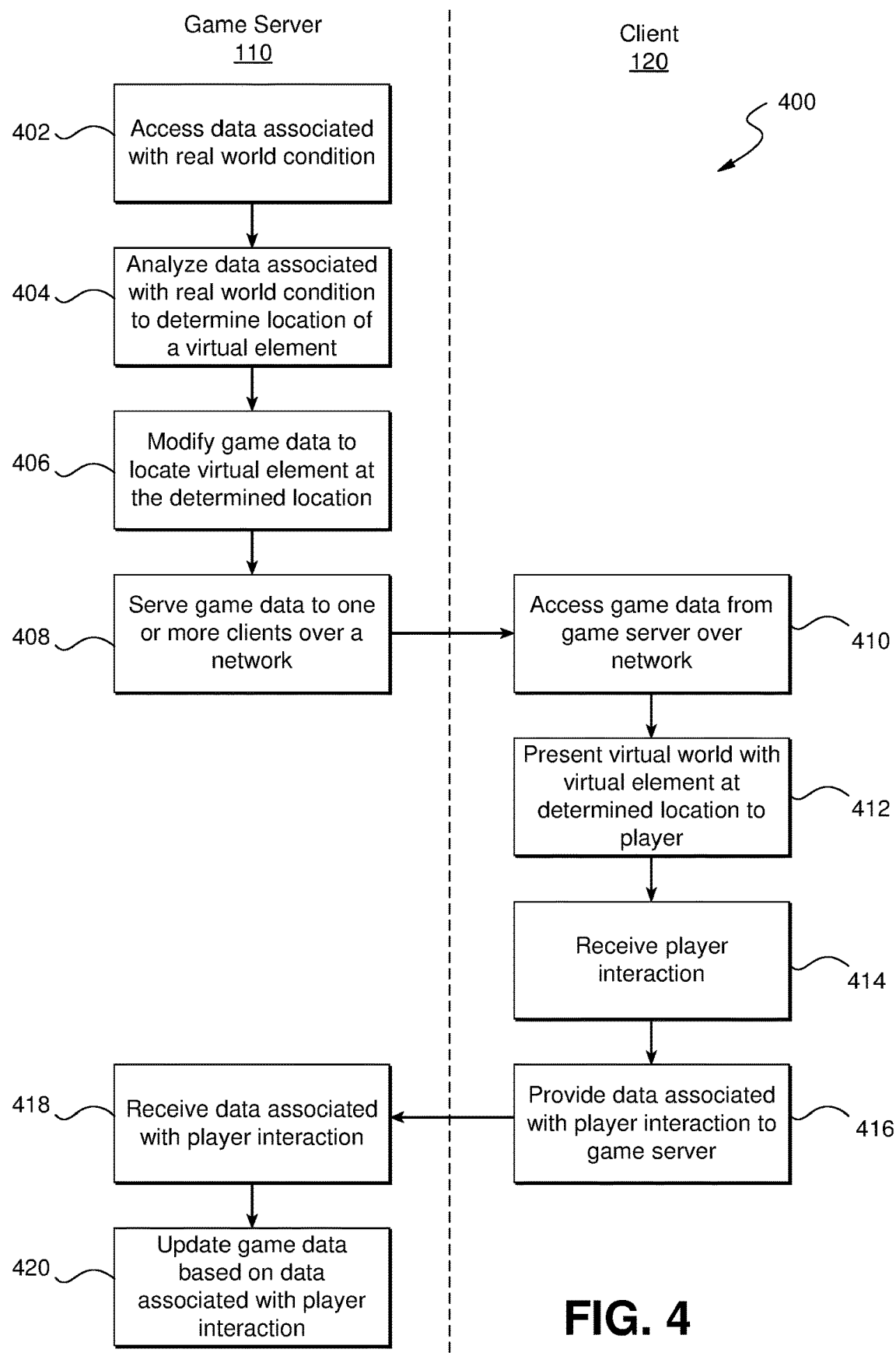
FIG. 4 is a client-server flow diagram of a method for implanting a location-based game, according to one embodiment.

Exemplary Client-Server Flow Diagram for Mapping Real World Actions to a Virtual World FIG. 4 depicts an exemplary client-server flow diagram of an exemplary method 400 for mapping real world actions to a virtual world of a parallel reality game according to one embodiment. The method 400 can be implemented using any suitable client-server architecture, such as the location-based gaming system 100 of FIG. 1. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In the embodiment shown in FIG. 4, the game server 110 accesses data associated with one or more real world actions at 402. For instance, the locator module 114 implemented by game server 110 can access data associated with one or more real world actions stored in the game database 115 and/or the real world action database 117. Alternatively, the locator module 114 can access one or more different data sources providing real world action data, such as a third party data service or other data source. Exemplary data associated with one or more real world actions accessed by the game server 110 can include current and past locations (singularly or in aggregate) of individuals (e.g. players) in the real world; local time data; local data providing locations of cultural value, recreational value, commercial value, or other value; map data; hazard data; weather data; event calendar data; and/or any other suitable data.

At 404, the game server 110 analyzes the data associated with the one or more real world actions to generate one or more experiences in the virtual world based on the data associated, with the one or more real world actions. For instance, the locator module 114 can analyze the data associated with the real world action to identify or determine virtual experiences in the virtual world based on the data associated with the one or more real world actions. The locator module 114 can determine virtual experiences that include any type of virtual element used in the parallel reality game, such as a virtual object, virtual item, virtual energy, or other virtual element that forms a part of the parallel reality game. Exemplary experiences in the virtual world will be discussed in detail below.

At 406, the game server 110 can modify game data stored in, for instance, the game database 115 and/or served to clients 120 over the network 130 to locate one or more virtual experiences based on the data associated with real world actions. For instance, the locator module 114 can create or add one or more virtual experiences associated with virtual elements to the game database 115 and associate virtual coordinate information with the data objects. The virtual coordinate information can specify the virtual coordinates of the determined location of the virtual experiences such that virtual elements are located in the virtual world and are associated with real world actions. In addition to creating or adding data objects to the game database 115, existing data objects stored in the game database 115 can be modified. For instance, virtual coordinate information associated with existing data objects can be adjusted to locate existing virtual elements as part of a virtual experience at coordinates in the virtual world determined based on real world actions.

At 408, the game server 110 serves game data associated with the parallel reality game to one or more clients 120 over the network 130. For instance, the game server 110 can send files encoded with game data to a plurality of clients 120 over the network 130. As set forth above, the game data can include data associated with virtual experiences located in the virtual world according to any of the techniques disclosed herein based on data associated with real world actions At 410, a client 120 accesses the game data served by the game server 110. For instance, the client 120 can send a request for game data and receive game data encoded in one or more data files from the game server 110. The client 120 then presents the virtual world of the parallel reality game to the player 412. For instance, the client 120 displays a representation of the virtual world to the user on a display screen associated with the client. The virtual world can include virtual experiences at locations determined based at least in part on data associated with real world actions. Other suitable interfaces can be provided to present the virtual world to a player, such as audio, vibratory, or other interfaces so that a player can interact with the virtual world without having to look at a display screen of the client device 120.

At 414, the client 120 receives data indicative of real world actions in the parallel reality game, such as data indicative of one or more player actions or player movement. Data indicative of player movement can be the location of the player in the real world determined by positioning device 128. At 416, the client 120 provides the data indicative of the player actions to the game server 110. The game server receives the data 418 and updates the game data for the parallel reality game based on the received data 420.

Exemplary Gaming Module

Figure 5:
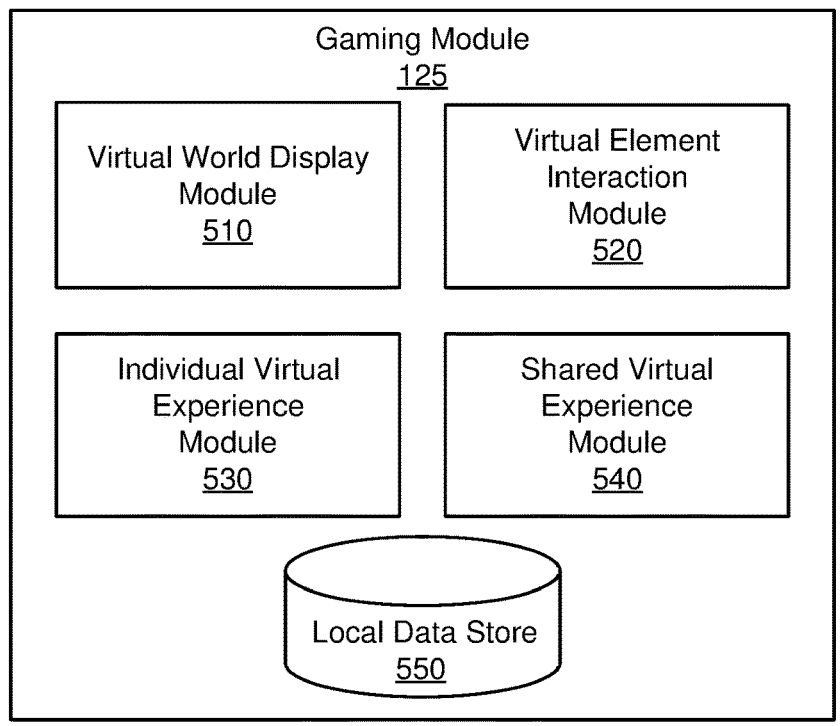
FIG. 5 is a block diagram of the gaming module of a client of FIG. 1, according to one embodiment.

FIG. 5 illustrates one embodiment of a gaming module 125 of a client 120. In the embodiment shown in FIG. 5, the gaming module 125 includes a virtual world display module 510, a virtual element interaction module 520, an individual virtual experience module 530, a shared virtual experience module 540, and a local data store 550. In other embodiments, the gaming module 125 contains different and/or additional elements. In addition, the functions may be distributed among the elements in a different manner than described.

The virtual world display module 510 displays a portion of the virtual world on a display (e.g., a screen) of the client 120. The virtual world display module 510 sends a request to the game server 110 for a portion of the virtual world that corresponds to the location of the client 120 in the real world (e.g., as determined by the positioning device 128). The portion of the virtual world may be centered at a location in the virtual world corresponding to the location of the client 120 in the real world. Alternatively, the portion of the world returned may consider other factors. For example, the portion of the virtual world may extend further in a current or predicted direction of travel of the client 120 in the real world. As another example, the virtual world may be divided into cells and the portion returned may be a current cell (e.g., a cell containing the location in the virtual world corresponding to the location of the client 120 in the real world) and, optionally, one or more cells that are adjacent to the current cell.

In one embodiment, the virtual world display module 510 renders an avatar or other representation of the player in conjunction with a portion of the virtual world. As the player moves through the real world, the representation of the player moves through the virtual world. The rendered portion of the virtual world may include one or more virtual elements with which the player can interact.

The virtual elements may have an interaction range. If the player's location in the virtual world is within a specified distance of the virtual element, the player may interact with the virtual element. If a player is initially out of range of a virtual element, the player may move in the real world to being the representation of the player in the virtual world within range of the virtual element. The interaction range for virtual elements may be the same for all virtual elements (e.g., corresponding to forty meters in the real world) or may vary based on the type of virtual element. In one embodiment, the visual representation of a virtual element is modified once the player moves within range indicating that the player may currently interact with the virtual element. When the player moves out of range, the visual representation of the virtual element may change again (e.g., by returning to its original form). The nature of the change in visual representation may depend on the type of the virtual element. Some types of virtual element may not change regardless of whether the player is in range or out of range.

In some embodiments, the visual representation of a virtual element may additionally or alternatively change when a user interacts with the virtual element. For example, the visual representation of a virtual element may change color scheme to indicate that the player (or the player's team) controls the virtual element. Similarly, the color scheme of the visual representation of a virtual element may change to indicate that the player has recently interacted with the virtual element. In one embodiment, the part of the visual representation of a virtual element changes from a first color to a second color when the user interacts with it indicating that the user is precluded from further interaction for a predetermined amount of time (e.g., five minutes). As the predetermined amount of time passes, the second color may gradually revert back to the first color. Thus, the player is given a visual indication of the amount of time left before the player can interact with the virtual element again.

The virtual element interaction module 520 provides interfaces for players to interact with virtual elements. In one embodiment, if a player selects a virtual elements in the virtual world while within the interaction range, the virtual element interaction module 520 provides controls with which the player may interact with the virtual element in one or more ways. The precise ways in which the player may interact with the virtual element may depend on the type of the virtual element and other game conditions. For example, for one type of virtual element, referred to as a "stop," the virtual element interaction module 520 might provide an option to access additional information about a real world entity corresponding to the stop (e.g., a landmark at the corresponding location in the real world) and an option to "spin" the stop to gain virtual items. As another example, for another type of virtual element, referred to as a "gym," the virtual element interaction module 520 might provide an option to access additional information about a real world entity corresponding to the gym, an option to "spin" the gym to gain virtual items, and an option to trigger an individual and/or shared virtual experience. Examples of these virtual experiences are described in greater detail below.

The options for interacting with a virtual element may also depend on other game conditions. In one embodiment, certain virtual elements (e.g., gyms) provide shared virtual experiences for limited periods of time. The location of a shared virtual experience may be indicated in the virtual world in advance of the shared virtual experience becoming available. For example, a timer counting down to a specified time when the shared virtual experience will become available may be displayed in conjunction with (e.g., above) a virtual element in the virtual world. Additional or alternative indicators of a future shared virtual experience may also be provided, such as an egg sat on or within the virtual element indicating a group battle against a creature (referred to as a "raid") or some other icon indicating the nature of the shared virtual experience.

At the specified time, the indicator in the virtual world may change to indicate that the shared virtual experience is available. For example, in the case where the initial indicator was an egg, the egg may be replaced with an avatar or icon indicating the type of creature that is available to battle. An updated timer may also be displayed indicating the amount of time left before the shared virtual experience expires.

In some embodiments, players may be able to interact with virtual elements without being within the interaction range under certain circumstances. For example, in one embodiment, if a player has previously visited a virtual element and currently controls it (e.g., by having left a creature or other virtual item to at the virtual element to defend it), the player may be able to interact with the virtual element remote. The options available for remote interactions may be different than those available when the player is within the interaction range of the virtual element. For example, remote interaction might be limited to using virtual items to power up, repair, heal, etc. the creature or item that the player left defending the virtual element.

The individual virtual experience module 530 provides virtual experiences to players that may be (or must be) completed by a single player. In one embodiment, a player triggers an individual virtual experience at a virtual element by selecting a corresponding control provided by the virtual element interaction module 520. Alternatively or additionally, some individual virtual experiences may be triggered automatically on selection of a virtual element or item in the virtual world. For example, if the player selects a creature in the virtual world, a minigame may be triggered that gives the player an opportunity to capture the creature (e.g., using virtual items).

In various embodiments, one or more individual virtual experiences are available at certain virtual elements (e.g., gyms) to gain control of the virtual element. If a virtual element is uncontrolled or controlled by the player's team, the individual virtual experience may include providing controls to enable the player to assign creatures or virtual items to the virtual element to gain, strengthen, or protect control of the virtual element by the player and/or the player's team. The virtual experience may also include showing a graphical representation of the virtual element identifying the creatures, virtual items, etc. that the player's team currently has located at the virtual element (e.g., defending it). The graphical representation may also provide avatars (or other representations) of the player's team members that contributed to the current control of the virtual element. Selection of a player's avatar may result in information about that player being displayed (e.g., a public player profile).

In contrast, if the virtual element is controlled by an opposing player or team, the virtual experience may include a minigame through which the player may gain control of the virtual element (or make the virtual element uncontrolled, thus allowing the player to deploy virtual items and gain control of the virtual element, as described above). In one embodiment, the minigame includes the player using their own creatures to battle creatures left by the controlling players to defend the virtual element. The defending creatures may have a motivation score that is decreased by a predetermined amount each time the creature is beaten in battle, with the creature leaving the virtual element once its motivation score reaches zero. Thus, the player may need to battle a defending creature several times to remove it from the virtual element. The motivation score of a creature may additionally decay over time, regardless of whether the creature is involved in a battle.

In some embodiments, players can increase the motivation score of their creatures that are defending the virtual element by using other virtual items. This may require that the player is within the interaction range of the virtual element or may be done either remotely or in person. If a virtual items is used in person to increase the motivation of a creature, an animation may play showing the item being given to the creature and an indicator of the creature's motivation increasing (e.g., a motivation meter increasing, a burst of hearts, balloons rising, etc.). If a virtual item is used to increase the motivation of a creature remotely, a different animation may play. For example, the animation may show a vehicle such as a drone taking the virtual item to the creature, the virtual item dropping via parachute, or the like.

Note that in some embodiments, although battling for control of a virtual element is described as an individual virtual experience, if two or more players trigger such an experience at the same time, they may complete the experience collaboratively. For example, if two or more players are battling to gain control of the same virtual element simultaneously (either due to real life coordination between the players or coincidence), the players may see each other's creatures in the battle mini game and their creatures may work together to battle the defending creatures. Similarly, other individual virtual experiences may be completed collaboratively if two or more players trigger them at the same virtual element at the same time. This is distinguished from the shared virtual experiences described below because the location-based game does not actively facilitate the formation of groups.

The shared virtual experience module 540 assists coordination of virtual experiences intended for completion by multiple players while those players are in a common geographic location in the real world. These shared virtual experiences may be impossible for a single player to complete but, in some instances, may be completed by a single player under some circumstances (e.g., if the player is of sufficiently high level). As described previously, shared virtual experiences may, in some cases, be available at specific virtual elements for a limited time period. Thus, the shared virtual experiences encourage players to coordinate to meet at the corresponding location in the real world at the appropriate time.

In one embodiment, when a player triggers a shared virtual experience, the player is added to a lobby and a countdown timer is started indicating an amount of time (e.g., two minutes) before the shared virtual experience begins. Other players who trigger the shared virtual experience while the original player is in the lobby may be added to the same lobby. The total number of players who may join the lobby (and thus the total number who may participate in the shared virtual experience together) may be limited to a certain number (e.g., twenty). If a lobby is full and another player tries to join, that player may be directed to wait or a new lobby with a new countdown may be created. In other words, the shared virtual experience module 540 may begin coordinating a second group to participate in the shared virtual experience together.

In some instances, a group of players may wish to control who has access to the lobby. For example, a group of friends may want to participate in the shared virtual experience together. If a lot of players are present at the same location, getting all of the friends into the same lobby using the process described above may prove difficult. Therefore, in one embodiment, a player may create a lobby and assign a code that is required to enter the lobby. Depending on the embodiment, the code may be automatically generated and/or the player may select the code manually. The code may be a number (e.g., a three digit number), a set of icons representing entities in the game, a password, or the like. The player creating the lobby tells other players the code in the real world and enter the code into their clients 120 to gain access to the lobby.

In some embodiments, players are required to have or use a virtual item (e.g., a virtual pass) to participate in the shared virtual experience. Players may receive a certain number of the required virtual item in a given time period for free (e.g., one per day). In one embodiment, if a player attempts to join the lobby of a shared virtual experience without the required virtual item, the player may be given an opportunity to purchase the required item in exchange for other virtual items and/or real world currency.

While in the lobby, players may be presented with information about the task to be completed in the shared virtual experience. The shared virtual experience module 540 may also provide controls in the lobby to enable the players to select creatures and/or virtual items to use in the shared virtual experience and/or use virtual items to power up and/or heal creatures. The lobby may be locked a predetermined amount of time (e.g., fifteen seconds) before the shared virtual experience begins. In such cases, players may be instructed to wait until a later time or may be added to a second lobby with a new countdown timer. This may prevent players from being added to the lobby at the last second leaving insufficient time for them to prepare for the shared virtual experience and/or prevent synchronization problems.

In one embodiment, once a lobby has been locked but before the shared virtual experience begins, the location-based gaming system 100 may reallocate the game servers 110 servicing the clients 120 of the group of players in the lobby. If the clients 120 of the group are being served by different game servers 110, the location-based gaming system 100 attempts to reallocates the gaming sessions such that the group's clients are served by the same game server 110. This may reduce latency, improve memory management, and provide a faster, more responsive, and more realistic coordinated shared virtual experience for players within the group. Alternatively, reallocation may be performed at other times, such as when new players join the lobby. For example, on joining a lobby, a player's client may automatically be reallocated to the same game server 110 as the client of the player who created the lobby.

Once the countdown for a lobby concludes, the shared virtual experience begins. During the shared virtual experience, the players who were in the lobby when the countdown concluded may collaborate to achieve a mutual objective. Alternatively, the players may be divided into two or more groups (e.g., based on the player's teams) and compete to achieve one or more objectives.

In one embodiment, the shared virtual experience includes two parts: a collaborative minigame and an individual minigame. In the collaborative minigame, the players work together to achieve a mutual objective. For example, where the shared virtual experience is a raid, the player's work together to battle a raid boss. The raid boss is a creature that may be powered up or otherwise more difficult to defeat than normal. If the group successfully completes the collaborative minigame (e.g., beats the raid boss in battle), then the individual minigame begins. For example, the player's may be given an opportunity to capture the raid boss for use in other aspects of the location-based game (e.g., to assign to defend virtual elements, to battle and capture virtual elements, etc.). In some embodiments, the individual minigame for a given player is impacted by that player's performance in the collaborative minigame and/or other factors. For example, the number of opportunities the player is given to complete the individual minigame may be determined based on metrics of the player's performance, such as an amount of damage done by the player and an amount of damage done by the player's team. The number of opportunities the player gets may additionally or alternatively be based on other factors, such as whether the player's team controls the virtual element, the player's level, a current weather condition, the time of day, etc.

Once a player has completed the shared virtual experience, the player may be prevented from returning to the experience, either for a specified length of time or indefinitely. For example, if the player successfully completes the shared virtual experience (e.g., by defeating and/or capturing a raid boss), the player may be precluded from repeating that specific shared virtual experience. In contrast, if the player was unsuccessful in completing the shared virtual experience (e.g., the player's group was defeated by the raid boss and/or the player failed to catch the raid boss), the player may be allowed to repeat the shared virtual experience either immediately or after waiting a specified amount of time (e.g., five minutes). In embodiments where a specific virtual item is required to participate in the shared virtual experience, repeating the experience may require an additional virtual item or the virtual item used to participate in the failed attempt may be used again. In other words, in the latter case, the virtual item is valid until the player successfully completes the shared virtual experience or the shared virtual experience becomes unavailable (e.g., because a time window during which the experience is available ends).

The local data store 550 includes one or more computer readable media configured to store data used by the other components of the gaming module 125. In one embodiment, the local data store 550 stores a cache of actions taken by the player so that if transmission of those actions to the game server 110 fails, the actions can be retransmitted at a later time. The local data store 550 may also include cached information about the virtual world. This may reduce the likelihood of information about the portion of the virtual world around the player's current position being unavailable as the player navigates through the virtual world (e.g., if the client's connection to the game server 110 is temporarily disrupted). One of skill in the art may recognize other forms of data that may be stored in the local data store 550 to improve performance and or robustness of the gaming experience.

Exemplary Method for Remote Interaction with a Virtual Element

Figure 6:
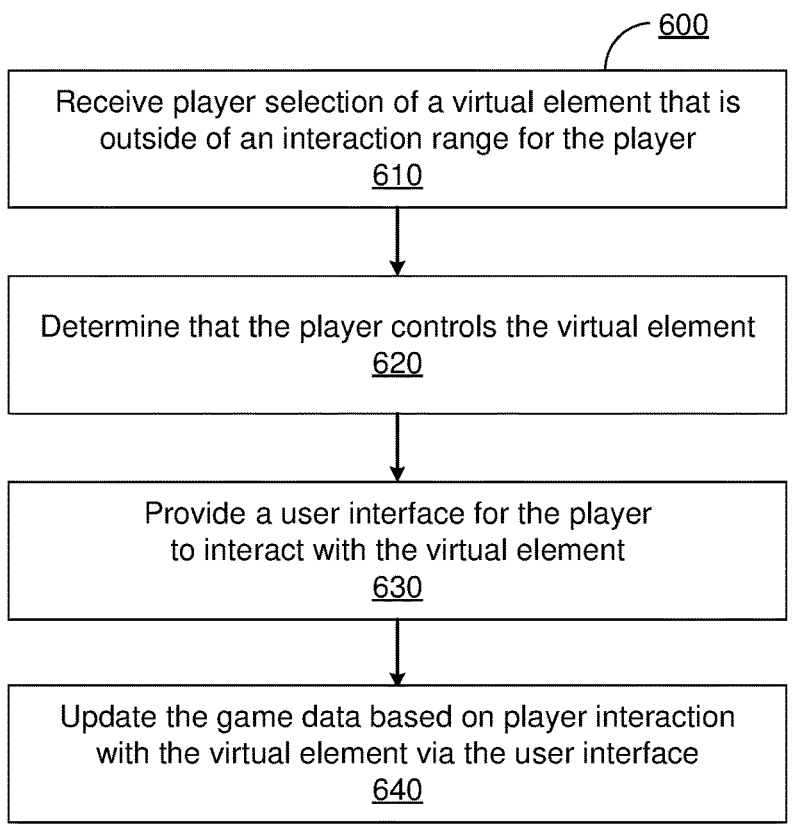
FIG. 6 is a flowchart illustrating a method for remote interaction with a virtual element in the location-based game, according to one embodiment.

FIG. 6 illustrates one embodiment of a method 600 for remote interaction with a virtual element in a location-based game. The steps of FIG. 6 are illustrated from the perspective of the gaming module 125 performing the method 600. However, some or all of the steps may be performed by other entities and/or components. In addition, some embodiments may perform the steps in parallel, perform the steps in different orders, or perform different steps.

In the embodiment shown in FIG. 6, the method 600 begins with the gaming module 125 receiving 610 selection of a virtual element by a player. The gaming module 125 compares the player's location in the virtual world (e.g., as determined from the player's location in the real world, as indicated by a positioning device 128) to the location of the virtual element. If the player is within the interaction range for the virtual element, the player may interact with the virtual element in the usual manner (not shown).

Assuming that the player is not within the interaction range, the gaming module 125 determines 620 whether the player controls the virtual element. In one embodiment, the player is considered to control the virtual element if the player has assigned a virtual item or creature to the virtual element that remains at or on the virtual element. Alternatively, the player may be considered to control the virtual element if the player's team has virtual items or creatures at or on the virtual element (e.g., defending the virtual element). If the player does not control the virtual element, the player may not be able to interact with the virtual element (not shown).

If the player does control the virtual element, the gaming module 125 provides 630 a user interface for the player to interact remotely with the virtual element. As described previously, remote interactions with a virtual element may allow for limited or different interactions relative to the interactions that are possible when a player is within the interaction range of the virtual element. In one embodiment, remote interactions are limited to using items to heal creatures and/or repair items assigned to the virtual element. Regardless of the specific interaction, the gaming module 125 updates 640 the game data based on the interaction. Updating 640 the game data may include sending updated game data and/or an indication of the player action to the game server 110.

Exemplary Method for Engaging in a Shared Virtual Experience

Figure 7:
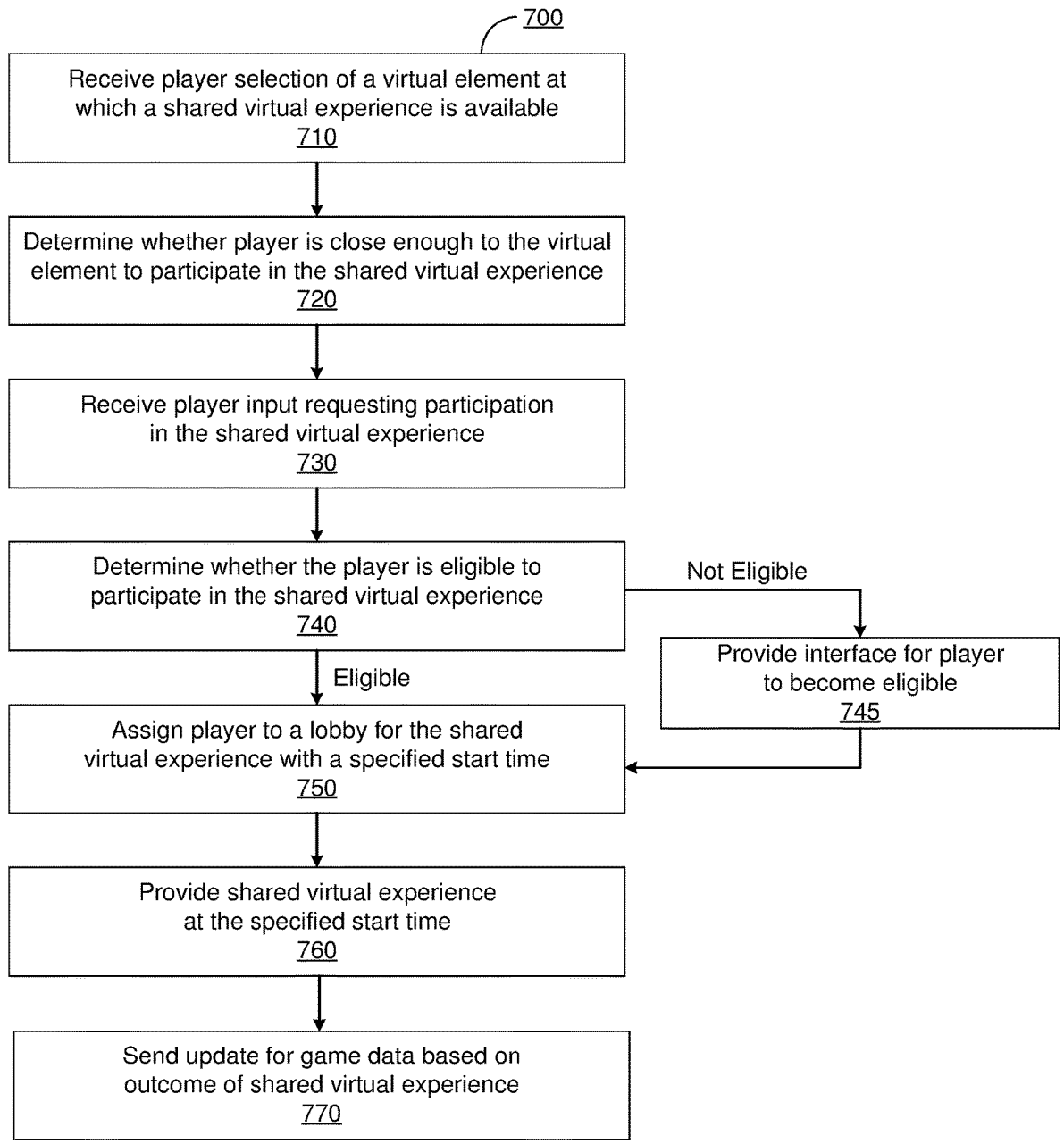
FIG. 7 is a flowchart illustrating a method for providing a shared virtual experience in the location-based game, according to one embodiment.

FIG. 7 illustrates one embodiment of a method 700 for providing a shared virtual experience in a location-based game. The steps of FIG. 7 are illustrated from the perspective of the gaming module 125 performing the method 700. However, some or all of the steps may be performed by other entities and/or components. In addition, some embodiments may perform the steps in parallel, perform the steps in different orders, or perform different steps.

In the embodiment shown in FIG. 7, the method 700 begins with the gaming module 125 receiving 710 selection of a virtual element at which a shared virtual experience is available by a player. For example, the user may select the virtual instrument by tapping on a visual representation of the virtual element in the virtual world on a touch screen of a client 120.

The gaming module 125 determines 720 whether the player is close enough to the virtual element to participate in the shared virtual experience. In one embodiment, the gaming module 125 compares the player's location in the virtual world (e.g., as determined from the player's location in the real world, as indicated by a positioning device 128) to the location of the virtual element. If the player is within the interaction range for the virtual element, the player is close enough to the virtual element to participate in the shared virtual experience. In other embodiments, other techniques for determining 720 whether the player is close enough to the virtual element may be used. For example, the gaming module 125 may determine whether the player is physically located within a geofenced region in the real world.

The gaming module 125 receives 730 player input requesting participation in the shared virtual experience. For example, in one embodiment, after the player selects 710 the virtual element, the player's client 120 displays information about the virtual element and one or more controls (e.g., an on-screen button) for requesting participation in the shared virtual experience. An indicator displayed on or near the controls may indicate a number of players who have already requested to participate in the shared virtual experience (e.g., a number of players in a lobby).

The gaming module 125 determines 740 whether the player is eligible to participate in the shared virtual experience. Eligibility may be based on a player's level, a player's total experience, a player's team, whether the player has a required item, or the like. In one embodiment, if the player is not eligible, the gaming module 125 may provide 745 an interface for the player to become eligible. For example, if the player is not eligible due to not having a required item, the player may be able to acquire the required item via the interface in exchange for virtual items and/or real world currency.

Assuming that the player is eligible (or became eligible), the gaming module 125 assigns 750 the player to a lobby for the shared virtual experience with a specified start time. In one embodiment, if the player is the first player to join the lobby, the gaming module 125 sets the start time by beginning a countdown of a predetermined length (e.g., two minutes). The start time for other players in the lobby is determined by the start time for the first player in the lobby. In other words, the shared virtual experience begins at the same (or substantially the same) time for the group of players. Lobbies may be public (meaning anyone can join) or private (meaning a code is required for a player to enter).

The gaming module 125 provides 760 the shared virtual experience at the specified start time. As described previously, in one embodiment, the shared virtual experience includes the group of players collaborating to battle a raid boss and, assuming they are successful, an individual minigame in which the players are individually given an opportunity to capture the raid boss. In other embodiments, other shared virtual experiences may be provided.

Regardless of the specific details of the shared virtual experience, the gaming module 125 sends 770 an update for the game data to the game server 110 based on the outcome of the shared virtual experience. For example, the update to the game data may indicate that a player has captured the raid boss, used a virtual item that was required to participate in the shared virtual experience, and is excluded from participating in the shared virtual experience in future. The gaming module 125 may send 770 instructions to update specific game data and/or an indication of the outcome of the shared virtual experience (from which the game server 110 may determine how the game data should be updated).

Additional Virtual Experiences Based on Real World Actions

Exemplary virtual experiences can be generated, for instance by a locator module 114 associated with the game server 110, based on data associated with real world actions will now be set forth. The experiences set forth herein are provided for purposes of illustration and discussion. Those of ordinary skill in the art, using the disclosures provided herein, should understand that the subject matter of the present disclosure extends to any suitable process or method for generation of virtual experiences in a virtual world based on data associated with real world actions.

In one embodiment, the data associated with real world actions can include actions associated with locations of cultural, recreational, or commercial value in the real world. Virtual experiences in the virtual world can enhance an experience in the virtual world, the real world, or both, based upon such real world actions. For instance, the data associated with real world actions can include data associated with locations, in the real world, of public artwork, historical markers, tourist attractions, scenic vistas, libraries, hiking trails, museums, universities, arenas, parks, and/or other locations. The locator module 114 can analyze the data and determine a virtual experience at a location in the virtual world corresponding to the actions associated with locations of cultural, recreation, or commercial value in the real world. For instance, a user located in the real world near a museum can be provided an opportunity by the virtual game to receive a virtual museum ticket in the virtual world, wherein the virtual museum ticket can be redeemed in the real world for admission to the museum. In this way, virtual experience in the virtual world can encourage players to travel to the locations of cultural, recreational, or commercial value in the real world in order to interact with such virtual experiences.

In yet another embodiment of the present disclosure, the data associated with the real world actions can include hazard data. The locator module 114 can analyze the data and determine a virtual experience in the virtual world based on the hazard data. In still another embodiment of the present disclosure, the data associated with real world action can include weather data, including natural disaster data, sunspot data, or the like. The locator module 114 can analyze the data and determine a virtual experience in the virtual world based on the weather data. For instance, the locator module 114 can determine to provide a virtual experience through damage to the virtual world in when an earthquake occurs in the real world. The virtual damage can be limited to virtual areas associated with the real world area in which the earthquake (or other weather event) occurred, or can affect a wider area of the virtual world.

In still another embodiment of the present disclosure, the data associated with real world actions can include event calendar data, including local time of day, or other data that provides, for instance, sporting events, parades, conferences, and/or other events that will draw crowds. The locator module 114 can analyze the data and determine virtual experiences which are associated with, for instance, local time of day, sporting events, parades, conferences, and/or other events that will draw large crowds. For example, real world action of the time of day being night time can make generate a virtual experience of virtual items being harder to locate.

Other exemplary applications of data associated with real world actions can include two or more users working together in the real world to achieve one or more goals in the virtual world as a virtual experience. A prerequisite to a virtual experience in the virtual world can be two or more users assembling at a particular location in the real world. When the two or more users assemble at a particular location in the real world, the game server can generate a virtual experience in the virtual world. For example, two or more users arriving at a common location can generate a virtual experience of a game that the users can engage in with one another, either in the virtual world, in the real world, or some combination thereof.

Still other exemplary applications of data associated with real world actions can include a first user and second user that travel to a real world location to exchange virtual elements in a virtual world between one another. A first user can travel to a real world location and leave a virtual element in the virtual world for the second user. The second user can then travel to the location in the real world to collect the virtual element in the virtual world. Such virtual element can be "locked" some as to only enable certain other users to "unlock" the virtual experience and virtual element For example, a first user can leave a virtual passport at a real world airport for a second user. The second user can collect the virtual passport by traveling to the airport, which will then allow the second user to travel in the virtual world to another location that would otherwise be inaccessible. However, a third user can be prevented from accessing the virtual passport if, for example, the third user is not a part of the same team or group as the first user.

As mentioned herein, all such virtual experiences can be directly and/or indirectly related to the real world action. For example, real world weather can cause a direct effect on virtual weather (i.e., heavy rains can cause flooding in the virtual world) or, can cause an indirect effect on virtual conditions (i.e., drought can cause prices to increase for produce due to limitation of harvest).

Finally, as discussed previously, two or more actions as described herein can be combined to result in one or more virtual experiences. Virtual experiences in the nature of two or more virtual elements can be distributed throughout the virtual world and require two or more users to engage in real world actions of visiting one or more real world locations to collect such virtual elements. Once users have collected all of the virtual elements, the game server can provide a virtual experience when the users assemble together at a real world location. In alterative implementations, a user can provide their respective virtual element to a different user that then assembles together with the other users at a real world location. For example, a first user can travel to a first real world location to collect a first virtual element. A second user can travel to a second real world location to collect a second virtual element. The first user and the second user can meet at a third real world location and present first virtual element and second virtual element at which time a virtual experience is provided in which the first user and the second user both collect a third virtual element. However, if first user is unable to travel to third real world location, first user can give first virtual element to a third user that can act as first user's proxy to meet with second user at third real world location to receive third virtual element.

Example Computing Device Architecture

Figure 8:
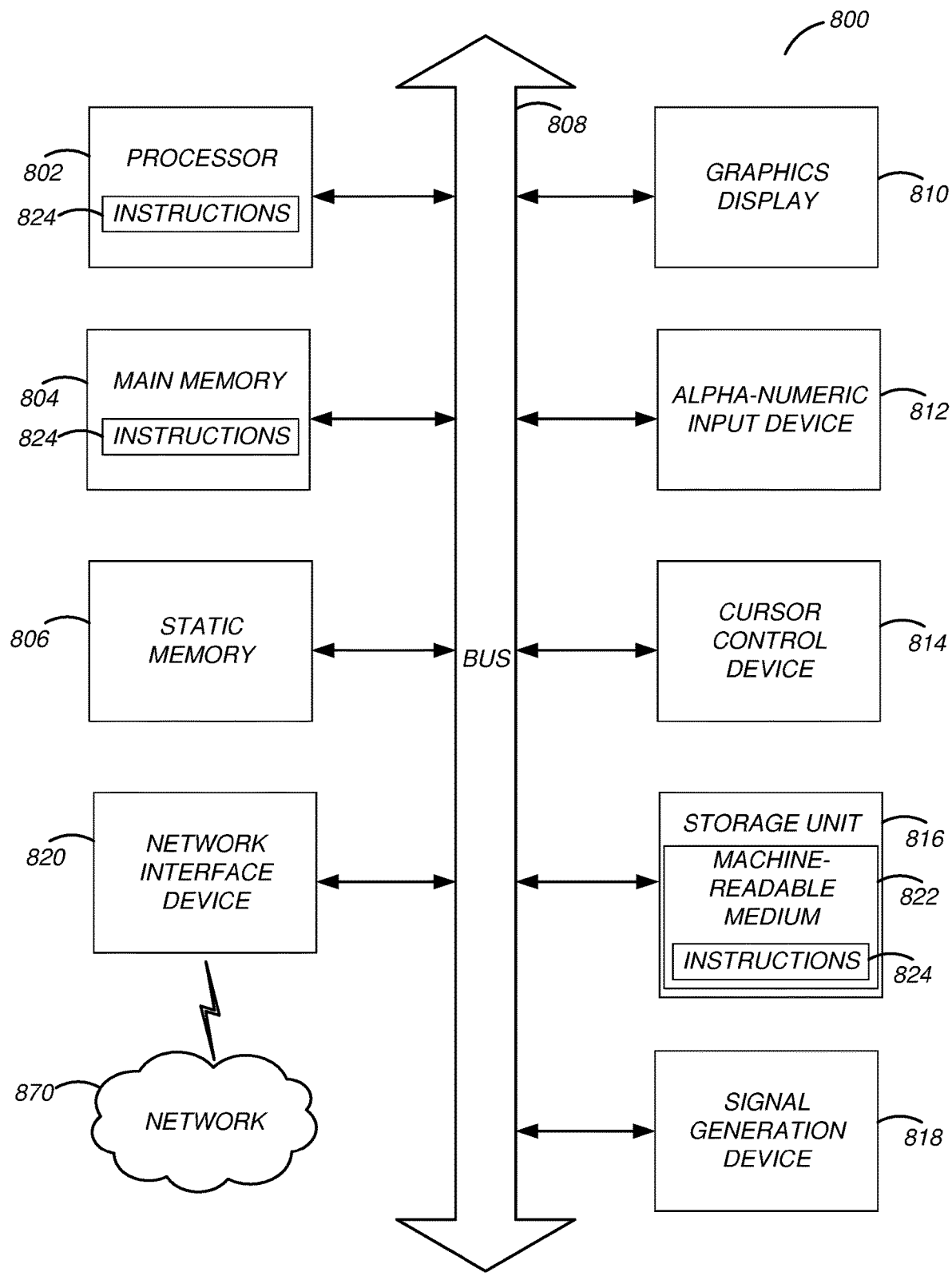
FIG. 8 is a block diagram illustrating an example computer suitable for use in the computer-based system of FIG. 1, according to one embodiment.

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800. The computer system 800 can be used to execute instructions 824 (e.g., program code or software) for causing the machine to perform any one or more of the methodologies (or processes) described herein, including those associated, and described, with the components (or modules) of a game server 110 and/or client 120.

The machine may be a server computer, a client computer, a personal computer (PC), a tablet PC, a set-top box (STB), a smartphone, a network router, switch or bridge, a cell phone tower, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally one or more processors 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 802 may refer to a single processor or multiple processors. The computer system 800 also includes a main memory 804. The computer system may include a storage unit 816. The processor 802, memory 804, and the storage unit 816 communicate via a bus 808.

In addition, the computer system 800 can include a static memory 806, a display driver 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 870 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing a shared virtual experience in a location-based game, the shared virtual experience associated with a real-world location, the method comprising:
   receiving, from a client device of a user, user input requesting participation in the shared virtual experience;
   determining whether a location of the client device is within an interaction range of the real-world location associated with the shared virtual experience;
   assigning the user to a lobby for the shared virtual experience based on determining that the location of the client device is within the interaction range;
   providing the shared virtual experience to the client device, the shared virtual experience including:
      a collaborative portion with a mutual objective achieved through interactions between users in the lobby including the user; and
      an individual portion subsequent to the collaborative portion with an individual objective achieved through actions by the user, wherein gameplay content of the individual portion is determined by an outcome of the collaborative portion; and
   updating a game database of the location-based game based on an outcome of the shared virtual experience including the outcome of the collaborative portion and an outcome of the individual portion.

2. The method of claim 1, further comprising:
   responsive to the user input, determining that the user is eligible to participate in the shared virtual experience,
   wherein assigning the user to the lobby for the shared virtual experience is further based on determining that the user is eligible to participate in the shared virtual experience.

3. The method of claim 1, further comprising:
   responsive to the user input, determining that the user is ineligible to participate in the shared virtual experience because the user does not possess a required virtual item;
   providing the user, via the client device, an opportunity to become eligible to participate in the shared virtual experience, the opportunity including exchanging at least one of a virtual item and real-world currency to acquire the required virtual item;
   receiving from the user at least one of the virtual item and the real-world currency in exchange for the required virtual item; and
   responsive to the user acquiring the required virtual item, determining that the user is eligible to participate in the shared virtual experience,
   wherein assigning the user to the lobby for the shared virtual experience is further based on determining that the user is eligible to participate in the shared virtual experience.

4. The method of claim 1, further comprising:
   determining a number of the users in the lobby, wherein assigning the user to the lobby is further based on determining that the number of users is less than a maximum number of users for a given lobby.

5. The method of claim 1, wherein the user input further requests joining the lobby, the method further comprising:
responsive to the user input, prompting the user to input a code assigned to the lobby; and
receiving the code from the client device of the user,
wherein assigning the user to the lobby is further based on receiving the code from the client device of the user.

6. The method of claim 1, wherein assigning the user to the lobby comprises:
determining that an existing lobby is not available to the user;
creating the lobby; and
assigning the user to the lobby.

7. The method of claim 1, wherein the mutual objective of the collaborative portion is battling a boss and the individual objective of the individual portion is capturing the boss.

8. The method of claim 1, wherein the users in the lobby are divided into a plurality of teams, and wherein the teams compete to achieve the mutual objective of the collaborative portion.

9. A computer system comprising:
one or more processors; and
a non-transitory computer-readable storage medium comprising executable computer program code for providing a shared virtual experience in a location-based game, the shared virtual experience associated with a real-world location, the computer program code when executed causing the one or more processors to perform operations including:
receiving, from a client device of a user, user input requesting participation in the shared virtual experience associated with the real-world location;
determining whether a location of the client device is within an interaction range of the real-world location associated with the shared virtual experience;
assigning the user to a lobby for the shared virtual experience based on determining that the location of the client device is within the interaction range;
providing the shared virtual experience to the client device, the shared virtual experience including:
a collaborative portion with a mutual objective achieved through interactions between users in the lobby including the user; and
an individual portion subsequent to the collaborative portion with an individual objective achieved through actions by the user, wherein gameplay content of the individual portion is determined by an outcome of the collaborative portion; and
updating a game database of the location-based game based on an outcome of the shared virtual experience including the outcome of the collaborative portion and an outcome of the individual portion.

10. The system of claim 9, the operations further comprising:
responsive to the user input, determining that the user is eligible to participate in the shared virtual experience,
wherein assigning the user to the lobby for the shared virtual experience is further based on determining that the user is eligible to participate in the shared virtual experience.

11. The system of claim 9, the operations further comprising:
responsive to the user input, determining that the user is ineligible to participate in the shared virtual experience because the user does not possess a required virtual item;
providing the user, via the client device, an opportunity to become eligible to participate in the shared virtual experience, the opportunity including exchanging at least one of a virtual item and real-world currency to acquire the required virtual item;
receiving from the user at least one of the virtual item and the real-world currency in exchange for the required virtual item; and
responsive to the user acquiring the required virtual item, determining that the user is eligible to participate in the shared virtual experience,
wherein assigning the user to the lobby for the shared virtual experience is further based on determining that the user is eligible to participate in the shared virtual experience.

12. The system of claim 9, wherein the user input further requests joining the lobby, the operations further comprising:
responsive to the user input, prompting the user to input a code assigned to the lobby; and
receiving the code from the client device of the user,
wherein assigning the user to the lobby is further based on receiving the code from the client device of the user.

13. The system of claim 9, wherein the users in the lobby are divided into a plurality of teams, and wherein the teams compete to achieve the mutual objective of the collaborative portion.

14. The system of claim 9, the operations further comprising:
determining a number of the users in the lobby,
wherein assigning the user to the lobby is further based on determining that the number of users is less than a maximum number of users for a given lobby.

15. A non-transitory computer-readable medium storing instructions for providing a shared virtual experience in a location-based game, the instructions, when executed by a computing device, causing the computing device to perform operations comprising:
receiving, from a client device of a user, user input requesting participation in the shared virtual experience;
determining whether a location of the client device is within an interaction range of a real-world location associated with the shared virtual experience;
assigning the user to a lobby for the shared virtual experience based on determining that the location of the client device is within the interaction range;
providing the shared virtual experience to the client device, the shared virtual experience including:
a collaborative portion with a mutual objective achieved through interactions between users in the lobby including the user; and
an individual portion subsequent to the collaborative portion with an individual objective achieved through actions by the user, wherein gameplay content of the individual portion is determined by an outcome of the collaborative portion; and
updating a game database of the location-based game based on an outcome of the shared virtual experience including the outcome of the collaborative portion and an outcome of the individual portion.

16. The computer-readable medium of claim 15, wherein the operations further comprise:

responsive to the user input, determining that the user is eligible to participate in the shared virtual experience,
wherein assigning the user to the lobby for the shared virtual experience is further based on determining that the user is eligible to participate in the shared virtual experience.

17. The computer-readable medium of claim 15, wherein the operations further comprise:
   responsive to the user input, determining that the user is ineligible to participate in the shared virtual experience because the user does not possess a required virtual item;
   providing the user, via the client device, an opportunity to become eligible to participate in the shared virtual experience, the opportunity including exchanging at least one of a virtual item and real-world currency to acquire the required virtual item;
   receiving from the user at least one of the virtual item and the real-world currency in exchange for the required virtual item; and
   responsive to the user acquiring the required virtual item, determining that the user is eligible to participate in the shared virtual experience,
   wherein assigning the user to the lobby for the shared virtual experience is further based on determining that the user is eligible to participate in the shared virtual experience.

18. The computer-readable medium of claim 15, wherein the operations further comprise:
   determining a number of the users in the lobby,
   wherein assigning the user to the lobby is further based on determining that the number of users is less than a maximum number of users for a given lobby.

19. The computer-readable medium of claim 15, wherein the user input further requests joining the lobby, the operations further comprising:
   responsive to the user input, prompting the user to input a code assigned to the lobby; and
   receiving the code from the client device of the user,
   wherein assigning the user to the lobby is further based on receiving the code from the client device of the user.

20. The computer-readable medium of claim 15, wherein assigning the user to the lobby comprises:
   determining that an existing lobby is not available to the user;
   creating the lobby; and
   assigning the user to the lobby.

21. The computer-readable medium of claim 15, wherein the mutual objective of the collaborative portion is battling a boss and the individual objective of the individual portion is capturing the boss.

22. The computer-readable medium of claim 15, wherein the users in the lobby are divided into a plurality of teams, and wherein the teams compete to achieve the mutual objective of the collaborative portion.

* * * * *